(12) United States Patent
Lee

(10) Patent No.: US 12,133,592 B2
(45) Date of Patent: Nov. 5, 2024

(54) MODULAR ASSEMBLY WITH POLYMAGNETS

(71) Applicant: N8madic, Inc., Mercer Island, WA (US)

(72) Inventor: Charlene Lee, Mercer Island, WA (US)

(73) Assignee: N8madic, Inc., Mercer Island, WA (US)

( * ) Notice: Subject to any disclaimer, the term of this patent is extended or adjusted under 35 U.S.C. 154(b) by 6 days.

(21) Appl. No.: 17/963,123

(22) Filed: Oct. 10, 2022

(65) Prior Publication Data

US 2023/0138042 A1  May 4, 2023

Related U.S. Application Data

(60) Provisional application No. 63/273,810, filed on Oct. 29, 2021.

(51) Int. Cl.
*A47B 87/02* (2006.01)
*A47B 87/00* (2006.01)

(52) U.S. Cl.
CPC ........ *A47B 87/0292* (2013.01); *A47B 87/008* (2013.01); *F16B 2200/83* (2023.08)

(58) Field of Classification Search
CPC .............. F16B 2200/83; A47B 87/008; A47B 87/0292
See application file for complete search history.

(56) References Cited

U.S. PATENT DOCUMENTS

| 4,893,958 | A | | 1/1990 | Wieland | |
|---|---|---|---|---|---|
| 5,720,547 | A | * | 2/1998 | Baird | A47B 87/008 312/107 |
| 10,070,725 | B2 | | 9/2018 | Nelson et al. | |
| 2009/0251241 | A1 | | 10/2009 | Fullerton et al. | |
| 2012/0119629 | A1 | | 5/2012 | Nelson et al. | |
| 2014/0047677 | A1 | * | 2/2014 | Trinh | E05B 65/0067 24/303 |
| 2017/0196086 | A1 | | 7/2017 | Bdeir | |
| 2018/0245429 | A1 | * | 8/2018 | Bhadbhade | E21B 34/06 |
| 2018/0317649 | A1 | * | 11/2018 | Kasravi | B43M 99/001 |
| 2024/0016542 | A1 | * | 1/2024 | Vadali | A61B 18/1815 |

OTHER PUBLICATIONS

International Searching Authority, International Search Report and Written Opinion, PCT Patent Application PCT/US2022/046202, mailed Jan. 10, 2023, 9 pages.

* cited by examiner

*Primary Examiner* — Matthew W Ing
(74) *Attorney, Agent, or Firm* — Perkins Coie LLP

(57) ABSTRACT

Modular units for forming structures, such as furniture assemblies or other structures. The modular units being interconnectable by magnetic connectors that have a cage with an end cap, and a bridge connected to the cage and spaced from the end cap to define a magnet void in the cage between the end cap and the bridge. A magnet is movably positioned within void, and a magnetic mass is coupled to the cage with the bridge is between the mass and the magnet. The magnet is movable in the cage void between a shielded position held against the bridge by a first magnetic attraction between the magnet and the mass, and a locked position held against the end cap by a second magnetic attraction that is greater than the first magnetic attraction.

17 Claims, 7 Drawing Sheets

MODULAR ASSEMBLY WITH POLYMAGNETS

CROSS-REFERENCE TO RELATED APPLICATION

This non-provisional patent application claims priority to and the benefit of U.S. Provisional Patent Application No. 63/273,810, titled MODULAR FURNITURE ASSEMBLY WITH POLYMAGNETS, filed Oct. 29, 2021, which is incorporated herein in its entirety by reference thereto.

TECHNICAL FIELD

Embodiments of the present disclosure are directed to the field of modular assemblies, and more specifically to modular assemblies using magnetic connectors.

BACKGROUND

Moving and buying furniture are often stress-inducing activities. Both require significant pre-planning, are expensive, and can deeply impact one's routine. When moving, it can be difficult and expensive to properly pack one's belongings. Large items in particular can be difficult to transport and may require hiring professional movers or renting a large vehicle. Buying furniture is likewise expensive and may similarly require hiring professionals or renting a vehicle. It may further require the frustration of significant at-home assembly. Furniture manufacturers in high-end markets have addressed these concerns, developing a specialty niche for multi-functional, modular furniture. This furniture allows for easier assembly and disassembly, leading to easier moving or storage. While these manufacturers have addressed the need for more easily assembled or moveable furniture in a specific market, less attention has been directed toward highly transient populations or populations in shared or micro housing.

These populations, such as students or recent graduates, often move one or more times per year in connection with the school year or job opportunities. They may stay in these different locations for very short periods of time, sometimes as little as a few months. Often these locations are small and are difficult to move into and out of. Logistics are further complicated by small or nonexistent budgets for covering moving expenses, limiting moving resources to a combination of friends, family, and the vehicle the individual moving owns. Improvements to affordable, space-conscious, and easily assembled and disassembled furniture stands to improve the moving and furniture buying process for these individuals.

DETAILED DESCRIPTION

Figure 1A:
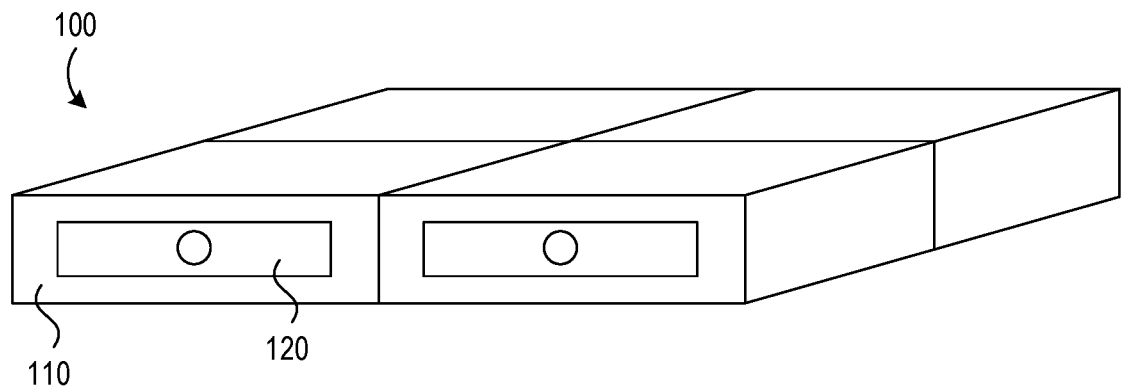
FIG. 1A is an isometric view of modular furniture, such as a bedframe, constructed with modular units in accordance with an embodiment of the present technology.

The present technology provides modular structures that are easily assembled and disassembled without the need for additional hardware or tools. Modular structures in accordance with embodiments of the present technology are constructed with subassembly modular units that are releasably interconnected using magnetic connectors embedded within the modular units' interior or exterior. These magnetic connectors utilize polymagnets or other similar magnet configurations that are optimized for polymagnet-to-polymagnet alignment and strong polymagnet-to-polymagnet holding forces at short separation distances. The magnetic connectors are configured with a shielded configuration and a locked configuration. In the shielded configuration, the polymagnets are retracted within their magnetic connectors to prevent attachment of the magnetic connector to unintended ferrous objects. However, when magnetic connectors are properly aligned and positioned immediately adjacent to one another, the magnetic connectors move to their locked configuration and their polymagnets move to their respective locked positions, wherein the polymagnets align with and firmly engage one another.

This technology overcomes obstacles presented by circumstances where structure assembly requires high-precision, high-strength, unusual alignment, or automated engagement—or a combination of two or more of these characteristics—in sensitive contact environments, or where using tools or additional hardware is difficult or dangerous, such as outer space, clinical or lab settings, industrial environments, construction or building environments, or similar applications. This technology also improves efficiency in circumstances where structure assembly or disassembly is performed often, such as high-volume manufacturing and/or building applications, close proximity human interaction environments such as consumer or commercial furniture, or children's' tactile toys. This technology also addresses limitations of polymagnets by creating a system that can modify a polymagnet's effective holding force to control engagement or to prevent engagement, or both, between polymagnets.

In particular, consumer modular furniture employing the present technology allows for easily moving from one living situation to the next or for easy reconfiguration, overcoming problems and obstacles presented by the prior art, in addition to providing other benefits. Modular furniture in accordance with embodiments of the present technology is constructed by releasably interconnecting roughly rectangular modular units vertically, horizontally, or in a combination of both vertically and horizontally to form furniture, such as bedframes, dressers, or a combination of furniture items. Provided within the modular units are drawers that may be used for storing clothing or other belongings when the modular furniture is either assembled or disassembled, as well as while moving.

As applied within modular furniture, when modular units are roughly aligned close to one another in a suitable arrangement, either vertically or horizontally, the opposing shielded configuration magnetic connectors within the modular units activate. Once activated, the polymagnets within the magnetic connectors move to their locked configuration and properly align the modular units, temporarily locking the modular units together. In some embodiment, the modular units are further engaged with each other interconnecting mating features, such as corresponding projections and grooves on opposing modular unit surfaces. This temporary lock is configured to withstand normal use of the modular furniture, such as opening and closing of drawers, use of the top surface, or placement of a bed on a furniture assembly.

When an owner wishes to disassemble the modular furniture, he or she must simply apply a great-than-normal-use, but manageable, force on one of the modular units to misalign the locked magnetic connectors. Once misaligned, the magnetic connectors return to their shielded configuration and the modular units can be easily separated. Separated, individual modular units may then easily be moved to a new location or a new arrangement.

Several specific details of the modular furniture technology and associated elements of the present technology are set forth in the following description and the Figures to provide a thorough understanding of certain embodiments of the invention. One skilled in the art, however, will understand that the present invention may have additional embodiments, and that other embodiments of the invention may be practiced without several of the specific features described below.

Figure 1B:
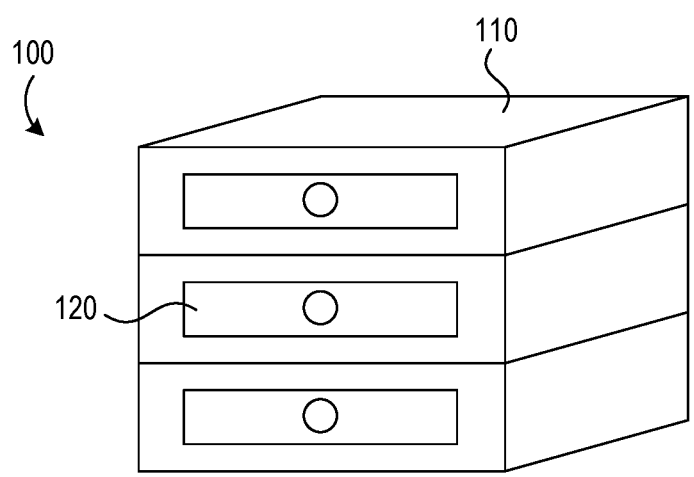
FIG. 1B is an isometric view of modular furniture, such as a dresser, constructed with modular units in accordance with an embodiment of the present technology.

FIGS. 1A and 1B are isometric views of modular furniture 100 constructed using modular units 110 illustrating two embodiments of the present technology. In FIG. 1A, the modular units 110 are combine horizontally alongside one another to create a platform bedframe. In FIG. 1B, the modular units 110 are combine vertically on top of one another to create a dresser. The modular units 110 may also be combine both vertically and horizontally to create a combine platform bedframe and dresser or other configuration of modular furniture 100. The modular furniture 100 as shown in FIGS. 1A and 1B further provides space-efficient storage with built-in drawers 120.

Figure 2:
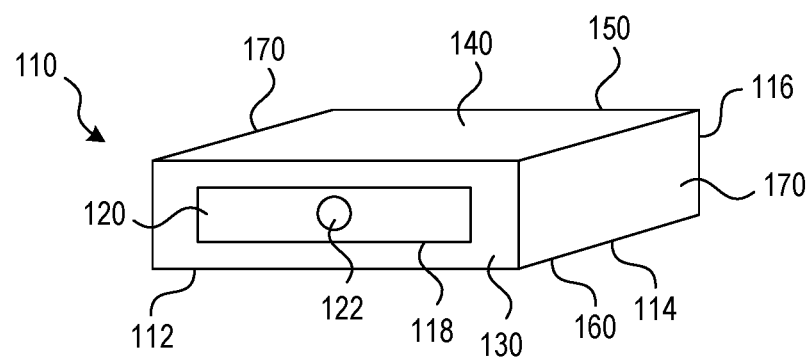
FIG. 2 is an isometric view of the modular unit with a drawer that provides an internal storage space.

FIG. 2 is an isometric view illustrating one embodiment of a modular unit 110. The modular unit 110 is roughly rectangular in shape, having a width 112, a depth 114, and a height 116. As illustrated, the modular unit width 112 is equal to 40 inches, the depth 114 is equal to 20 inches, and the height 116 is equal to 10 inches. One of ordinary skill in the art would appreciate that the width 112, the depth 114, and the height 116 can be modified as necessary for different modular unit 110 applications. These alternative applications may include modular units 110 intended for different modular furniture 100 arrangements or for special modular furniture 100 applications requiring modular units 110 with larger or smaller dimensions for one or more of its edges.

The modular unit 110 further has six sides, a front 130, a top 140, a back 150, a bottom 160, and sides 170 (any individual side, "a side 130-170;" collectively, "sides 130-170"). On the front 130, a slot 118 is provided for storing the drawer 120, which may be pulled from or placed within the modular unit 110. The drawer 120 provides an interior area for storage of an owner's belongings within the modular unit 110 and constructed modular furniture 100. The exterior of the drawer 120 is shaped to fit within the slot 118 and provide for easy removal and reinsertion of the drawer 120 within the slot 118. The drawer 120 is slid into and from the modular unit 110 using a handle 122.

As illustrated, the modular unit 110 and drawer 120 are concurrently constructed using three-dimensional printing or another additive manufacturing processes so that the drawer 120 may be slid out, but not be removed, from the modular unit 110 once manufacturing is complete. The modular unit 110 and drawer 120, and any subassembly elements thereof, may alternatively be individually constructed using three-dimensional printing or another additive manufacturing processes and combine after manufacturing is complete. When the drawer 120 is constructed separate from the modular unit 110, the drawer 120 may be removably connected to the slot 118 and the modular unit 110 by drawer slide hardware or the drawer 120 and the slot 118 may be shaped so use of the drawer 120 does not require additional hardware.

In other embodiments, the modular unit 110 and the drawer 120, and any subassembly element thereof, may be constructed using wood, plastic, metal, or composite. These elements further be constructed using any suitable material providing adequate strength for the modular furniture 100 built using the modular units 110 and adequate strength for holding an owner's belongings within the drawer 120. To construct the modular units 110 and the drawer 120 in these other embodiments, the elements may be integrally formed as a single piece of construction or may be partially or entirely formed independently and combined using fasteners or other physical or chemical means for connection.

The modular units 110 of modular furniture 100 are secured together by magnetic connectors 200. More specifically, the magnetic connectors 200 may secure the modular units 110 together using optimized magnetic fields produced by polymagnets having specific magnetic properties. Polymagnets as illustrated within the magnetic connectors 200 have optimized magnetic fields for exerting high polymagnet-to-polymagnet ("PTP") holding forces when in close proximity to one another and aligning opposing polymagnets along their cylindrical axes. Using magnetism and specifically optimized polymagnets for securing the modular units 110 together allows for easy modular furniture 100 assembly and disassembly without sacrificing a secure, rigid connection. Polymagnets optimized for inter-magnet alignment easily align the modular units 110 when building modular furniture 100 and do not require traditional mechanical alignment (i.e., aligning individual furniture elements that may easily be incorrectly oriented). Further, polymagnets optimized for strong PTP connection at short separation distances create a secure connection between the modular units 110 to construct sturdy, reliable modular furniture 100 without the hassle of traditional mechanical furniture assembly (i.e., use of tools and fasteners like screws to assemble or disassemble individual furniture elements).

In some embodiments, the modular units 110 can further include alignment features or interconnecting mating features coupled to or integrally formed with a surface of the modular unit 110. The alignment features can be corresponding structures of the modular units 110 that interlock when assembled, providing additional structural support between the modular units 110 while also providing visual guides for interconnecting the modular units 110. For example, the alignment feature can be corresponding protrusions and recesses on opposing surfaces, such as pegs and holes, ribs and troughs, and any similar structures allowing for the protrusion to align with and fit within the recess when the module units 110 are assembled.

Figure 3:
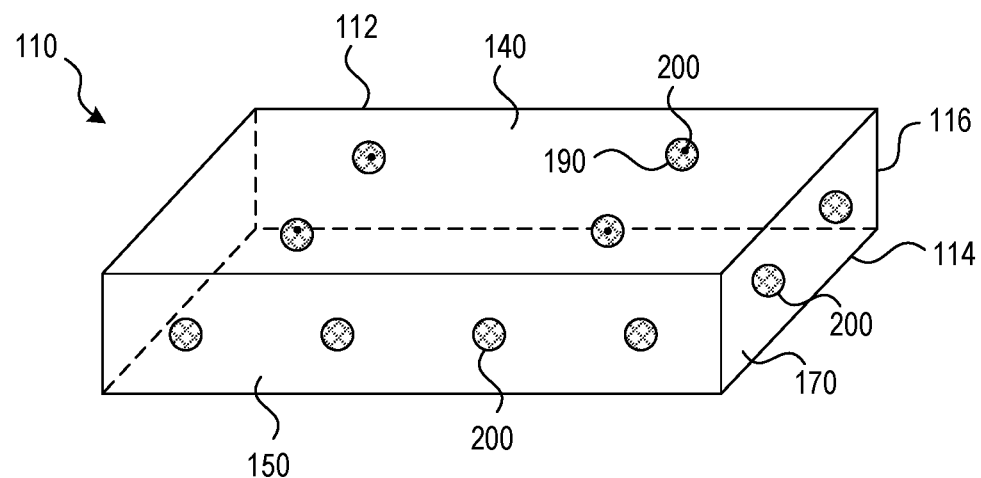
FIG. 3 is an isometric view of the back of a modular unit with identified magnetic connector locations.
Figure 4:
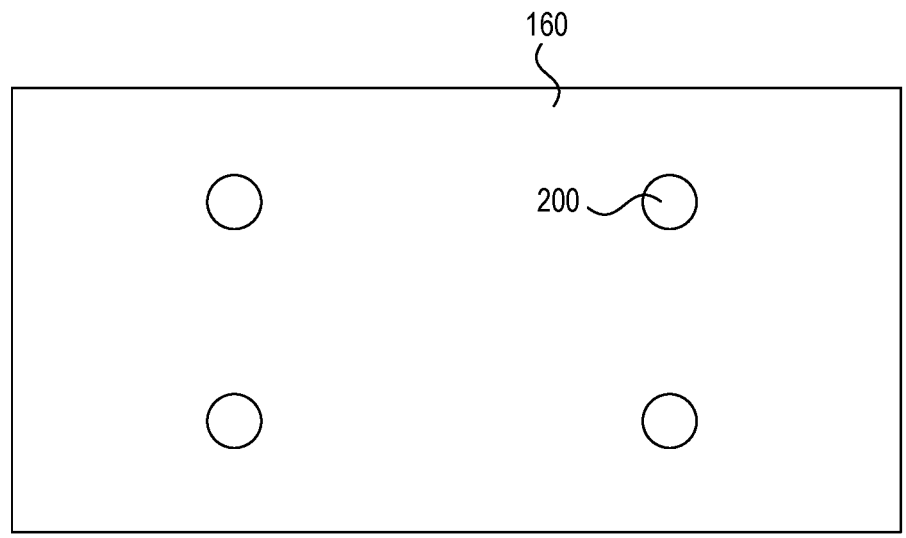
FIG. 4 is a planar view of the bottom of a modular unit with identified magnetic connector locations.

FIG. 3 is an isometric view of the back 150 of a modular unit 110 and FIG. 4 is a planar view of the bottom 160 of a modular unit 110. Together, FIGS. 3 and 4 illustrate one mapping of magnetic connectors 200 on a modular unit 110. This mapping provides four magnetic connectors 200 evenly spaced along a centerline of the back 150, two magnetic connectors 200 evenly spaced along a centerline of the sides 170, and one magnetic connector 200 centered within each of four evenly divided quadrants of the top 140 and bottom 160. No magnetic connectors 200 are mapped on the front 130. This mapping of magnetic connectors 200 allows for multiple modular units 110 with corresponding mappings to interchangeably connect and securely attach to one another. For example, the four magnetic connectors 200 evenly spaced on the top 140 of a first modular unit 110 will align with the four magnetic connectors 200 evenly spaced on the bottom 160 of a second modular unit 110. Similarly, considering the same modular units 110, the two magnetic connectors 200 on a left side 170 of the first modular unit 110 will align with two magnetic connectors 200 on a right side 170 of the second modular unit 110.

In other embodiments, the magnetic connectors 200 may be mapped on each side 130-170 of the modular unit 110. Alternatively, magnetic connectors 200 may be mapped on less than all or as few as one side 130-170 of the modular unit 110. Relative to the mapping of FIGS. 3 and 4, additional magnetic connectors 200 may be needed on any one or more sides of the modular unit 110, or an application may allow for fewer magnetic connectors 200. Mapping of other embodiments may map magnetic connectors 200 using a standard separation distance, such as a specified distance, to allow for assembly of modular units 110 is any configuration regardless of orientation of adjacent modular units 110. Mapping may also be unique to a specific modular unit 110 or modular furniture 100 setup to act as an alignment key for specific modular unit 110 assembly options. The ultimate decision for which modular unit sides 130-170 to include magnetic connectors 200 and their mapping depends on the shape, size, and intended modular unit 110 arrangement or modular furniture 100 to be built using the modular units 110.

Figure 5:
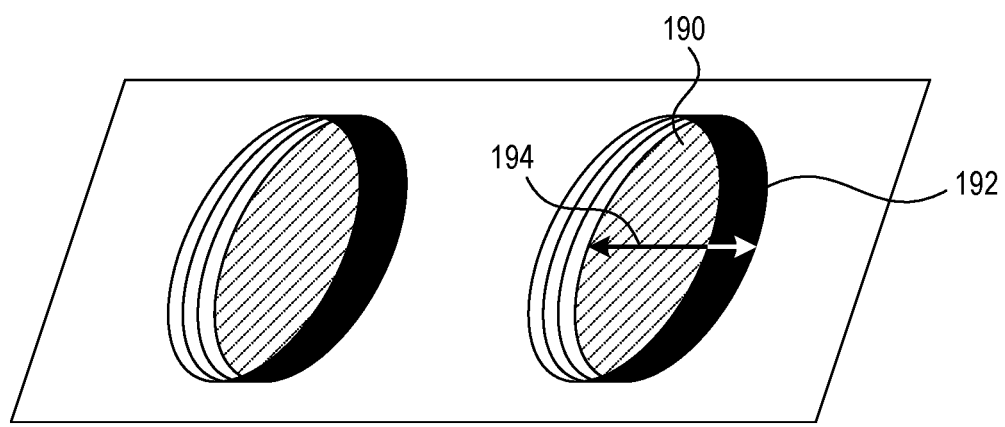
FIG. 5 is an enlarged isometric view of two magnetic connector sockets within a modular unit.

The magnetic connectors 200 are secured to the modular unit 110 in sockets 190 corresponding to the mapping. FIG. 5 is an enlarged isometric view illustrating one embodiment of sockets 190 within the interior of the modular unit 110. The sockets 190 are formed as recesses from the interior of a side 130-170 of a modular unit 110. The sockets have a depth 192 and diameter 194 corresponding to the shape of the magnetic connector 200. In an alternative embodiment, the sockets 190 are formed as blind holes through a side 130-170 of a modular unit, where the thickness of the blind hole is 1 mm.

The magnetic connectors 200 may be secured within any embodiment of the socket 190 byway of press-fit assembly, adhesives, or similar setting materials, or may be secured within the sockets 190 using hardware such as fasteners or additional nesting framework provided within the sockets 190 or the modular unit 110. Some magnetic connectors 200 may instead include mechanical connection features such as threading, keyways, or similar features on their exterior for direct engagement with the modular unit 110. Once secured within the sockets 190, the magnetic connectors 200 may be covered with a cosmetic cap or another suitable sealing compound to further secure the magnetic connector 200 within the modular unit 110, to create an aesthetically pleasing finish, or both. In an alternative embodiment where the modular units 110 are constructed using three-dimensional printing or another additive manufacturing processes, magnetic connectors 200 may instead in-part be integrally formed within a modular unit side 130-170, as independently detailed for magnetic connector 200 elements below.

Figure 6:
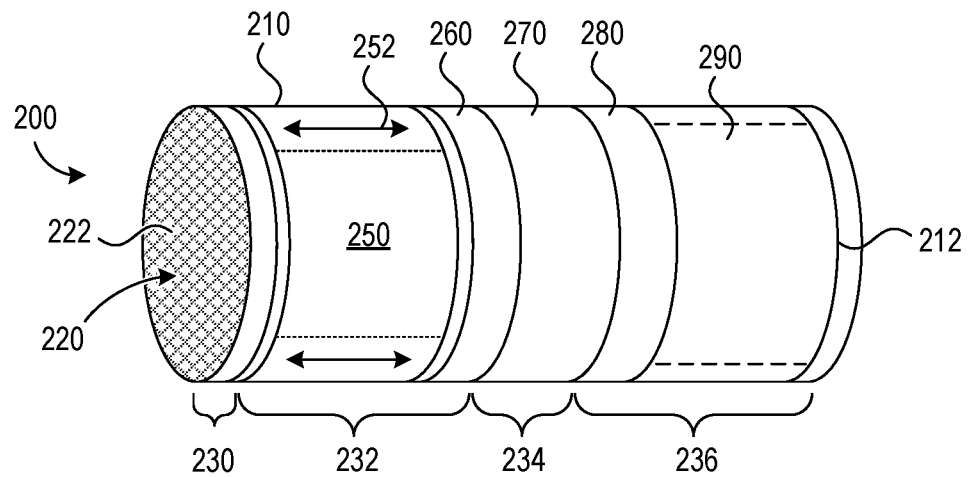
FIG. 6 is an isometric view of a magnetic connector in a shielded configuration.

FIG. 6 is an isometric view illustrating one embodiment of a magnetic connector 200 in a shielded configuration. Magnetic connectors 200 have a shielded configuration and a locked configuration. In the shielded configuration, a polymagnet 260 within the magnetic connector 200 is retracted to a shielded position located centrally in the magnetic connector 200, and when the magnetic connector 200 is installed in a modular unit 110, the shielded position is recessed away from the exterior and interior surfaces of a modular unit side 130-170. The magnetic field optimization of the polymagnet 260 is configured such that when in the shielded position, the polymagnet 260 will not engage with other magnets or ferrous objects other than similarly optimized polymagnets in close proximity and alignment. In the locked configuration, the polymagnet 260 within the magnetic connector 200 is in a locked position just below a cap 220 and engaged with the polymagnet 260 of an immediately adjacent magnetic connector 200. In the locked position, engaged polymagnets 260 exert a strong holding force against one another, releasably locking the immediately adjacent magnetic connectors 200 together.

In the illustrated embodiment of the magnetic connector 200 of FIG. 6, the exterior of the magnetic connector 200 is defined by a hollow cylindrical cage 210, a base 212, and the cap 220. Within the cylindrical cage 210, the magnetic connector 200 has a polymagnet void 250, a polymagnet 260, a bridge 270, a steel mass 280, and a steel mass void 290. The cylindrical cage 210 is a non-ferrous, non-magnetic, thin-walled tube with an open end and a closed end at its base 212 with cylindrical cage's 210 length dictated by the lengths of its internal components. The cylindrical cage 210 has an interior diameter corresponding with or slightly larger than the exterior diameter of the polymagnet 260 and an exterior diameter sized to fit within the recesses formed in the sides 130-170 of the modular unit 110 in the selected mapping pattern, given a desired assembly method.

In the illustrated embodiment, the cap 220 is generally a disk corresponding with the shape of the cylindrical cage 210 and has a thickness 230. The disk is constructed using a non-ferrous or non-magnetic material, is nonobstructive to magnetic forces, and may also include a flange for engaging with the open end of the cylindrical cage 210. The cap 220 may be attached to the cylindrical cage 210 using press-fit assembly, adhesives or similar setting materials, threading, using hardware such as fasteners, or any alternative means for securely attaching the cap 220 to the cylindrical cage 210. Once attached, the cap 220 provides a contact surface 222 perpendicular to the axis of the cylindrical cage 210.

In another embodiment, the cap 220 may be integrally formed with the cylindrical cage 210 and instead the base 212 independent from and attached to the cylindrical cage 210 following a similar method as disclosed regarding the cap 220 of the illustrated embodiment in FIG. 6. In another embodiment, the cylindrical cage 210 may instead be a thin-walled tube with two open ends where the base 212 and cap 220 are respectively attached to the cylindrical cage 210 following a similar method as disclosed regarding the cap 220 of the illustrated embodiment in FIG. 6. Alternatively, in a further embodiment, the cylindrical cage 210 may be integrally formed within a side 130-170 of the modular unit 110 during modular unit side 130-170 manufacture. In this embodiment, the cap 220 and base 212 are either also integrally formed or later attached thereto using a similar method as disclosed regarding the cap 220 of the illustrated embodiment in FIG. 6.

Figure 7:
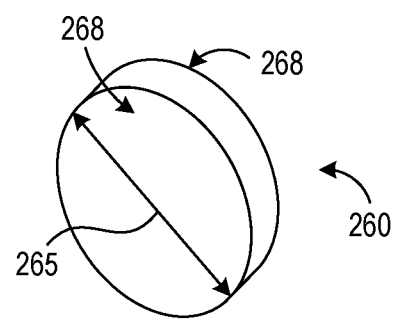
FIG. 7 is an isometric view of a polymagnet shown removed from the magnetic connector of FIG. 6.

Adjacent to the cap 220 is the polymagnet void 250 with a length 232. The length 232 is at most half the diameter of the polymagnet 260 and acts to prevent the polymagnet 260 from reversing orientation within the cylindrical cage 210 or from binding against the interior of the cylindrical cage 210. In the shielded configuration, the polymagnet 260 is in its shielded position within the polymagnet void 250. The polymagnet 260 is a polymagnet as generally understood in the art, providing for custom, optimized magnet performance in specified use cases. In the present illustration, the polymagnet 260 is a cylinder, disk, or ring shaped polymagnet. When the polymagnet 260 is implemented as a ring, the inner diameter of the ring is substantially large relative to the outer diameter of the ring. In any implemented shape, the polymagnet 260 produces an optimized magnetic field for strong PTP holding force along its cylindrical axis at short separation distances and alignment along cylindrical axes between two polymagnets 260. This field may exert a holding force against other magnets or ferrous objects also, but at weaker strengths than against other polymagnets 260. Similarly, polymagnets 260 may only achieve their strongest PTP holding force when engaged with another polymagnet 260. Referencing FIG. 7, an isometric view of the polymagnet 260 shown removed from the magnetic connector 200, the illustrated polymagnet 260 is a cylindrical or disk-shaped neodymium polymagnet with a diameter 265, attraction surfaces 268, and a three-layer nickel-copper-nickel plating. In alternative embodiments, the polymagnet 260 may have varied magnetic field optimization or may likewise be varied in diameter 265 or length to provide stronger or weaker PTP holding forces for different magnetic connector 200 or modular unit 110 applications. Accordingly, the polymagnet void length 232 may be longer or shorter than half the diameter of the polymagnet 260 or otherwise modified to allow the polymagnet 260 to move within the polymagnet void 250 or to regulate the magnetic field of the polymagnet 260 at the cap contact surface 222.

Figure 8:
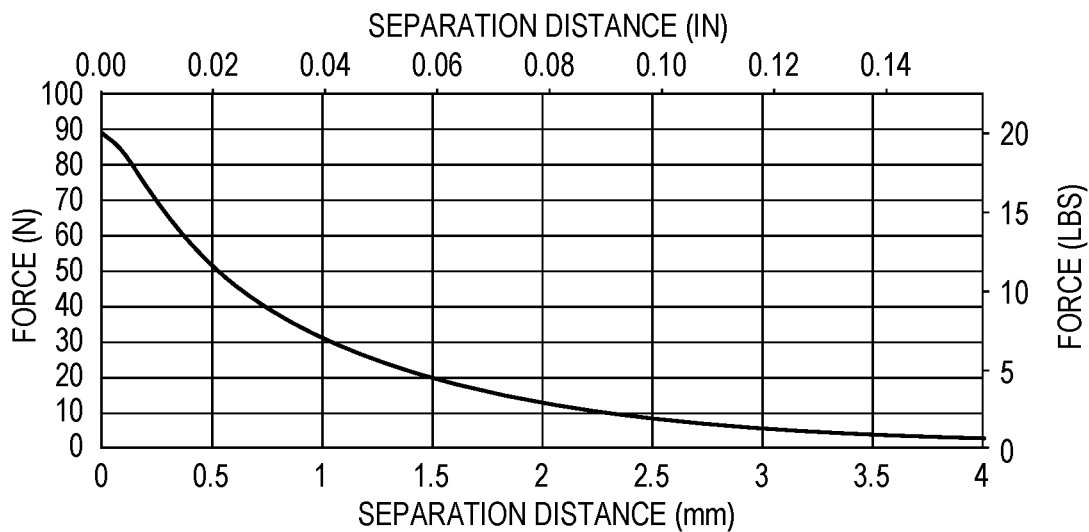
FIG. 8 is a graph of the optimized holding force of a polymagnet when functioning in polymagnet-to-polymagnet configurations.
Figure 9:
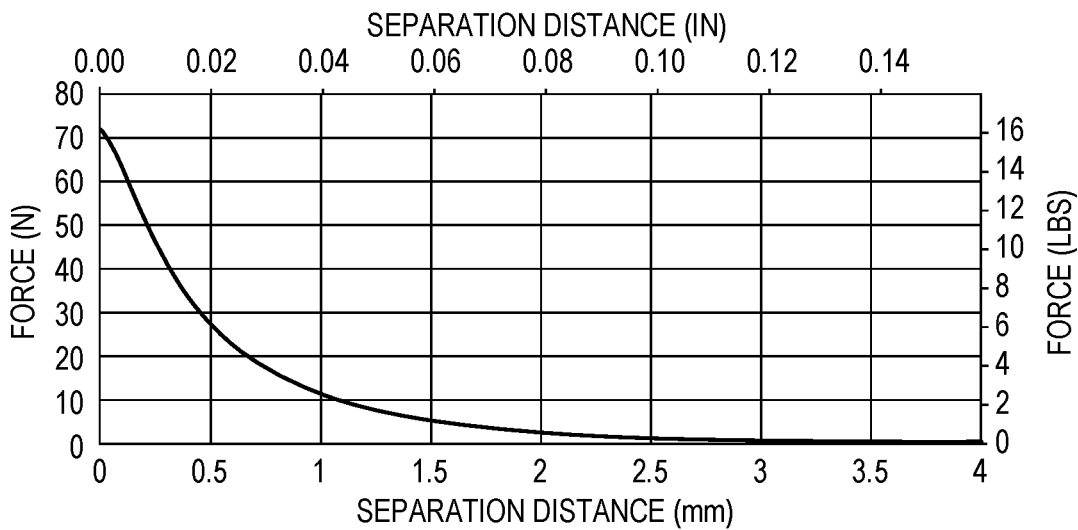
FIG. 9 is a graph of the optimized holding force of a polymagnet when functioning in magnet-to-steel configurations.

FIGS. 8 and 9 provide graphs of the magnetic holding force specifications for the illustrated polymagnet 260. Referencing FIG. 8, a graph of PTP holding force given separation distance between polymagnets, polymagnet 260 is optimized for PTP applications, providing axial alignment of two polymagnets 260 along their cylindrical axis with peak PTP holding force when separated by less than 0.02 inches. FIG. 8 shows near exponential increase in holding force as separation between polymagnets 260 decreases. The illustrated polymagnet 260 presents weaker magnet-to-steel holding forces than PTP forces. This difference is shown by comparing FIG. 9, detailing the magnet-to-steel holding force given separation between the polymagnet 260 and a steel plate of 0.031 inches thickness, with FIG. 8. Holding forces of FIG. 8 (PTP) range from ~30% to ~500% greater that holding forces of FIG. 9 (magnet-to-steel) given the same separation between magnet and magnet or magnet and steel.

Returning to FIG. 6, the polymagnet 260 is unobstructed to slide along the cylindrical axis of the cylindrical cage 210 within the polymagnet void 250. In the shielded configuration, however, the polymagnet 260 is held in its shielded position by a holding force the polymagnet 260 exerts against the steel mass 280, herein referenced as the shielded holding force. The shielded holding force is relative to a length 234 of the bridge 270 separating the polymagnet 260 and the steel mass 280 and the mass of the steel mass 280. More specifically, the shielded holding force is directly a function of the bridge length 234 and the mass of the steel mass 280.

The bridge 270 is made of a non-ferrous and non-magnetic material, is nonobstructive to magnetic forces, and acts as a barrier between the polymagnet 260 and the steel mass 280, separating the polymagnet 260 and the steel mass a distance equal to length 234. As illustrated, the bridge length 234 is 0.093 inches. The length 234 may be larger or smaller, however, given different magnetic connector 200 or modular unit 110 applications or when implementing polymagnets 260 having different optimizations. The bridge 270 may be integrally formed with the cylindrical cage 210 at the time of cylindrical cage 210 manufacture. Alternatively, the bridge 270 may be assembled within the cylindrical cage 210 by press-fit assembly, adhesives or similar setting materials assembly, or mechanical assembly using fasteners extending through the exterior of the cylindrical cage 210 and into the bridge 270. Where the cylindrical cage 210 is integrally formed within a side 130-170 of the modular unit 110, the bridge 270 may also be integrally formed within the cylindrical cage 210 in the side 130-170. The bridge 270 may alternatively be assembled within the integral cylindrical cage 210 using the assembly methods described regarding a non-integral cylindrical cage 210.

In the illustrated embodiment, the steel mass 280 is a cylinder or disk-shaped steel mass unobstructed to move within the steel mass void 290 and, when in the shielded configuration, is held against the bridge 270 by the shielded holding force. The steel mass 280 has a mass sufficient for the shielded holding force to hold the steel mass against the bridge 270. The steel mass may alternatively be spherical, square, or any shape of a metal slug that fits within and may freely move within the steel mass void 290 when not in the shielded state. Although labeled "steel," one of ordinary skill in the art would appreciate that the steel mass 280 may be any ferrous or magnetic material suitable for attraction to the polymagnet 260.

The steel mass void 290 as illustrated has a length 236 of at most half the diameter of the steel mass 280 to prevent the steel mass 280 from moving out of alignment with the cylindrical axis of the cylindrical cage 210 when the steel mass 280 is not held against the bridge 270. In the varied embodiments of the steel mass 280, the tail length 236 may alternatively be larger or smaller than the diameter of the steel mass 280 to allow the steel mass 280 to move unobstructed within the steel mass void 290. The tail length 236, in combination with the bridge length 234, also acts to offset the polymagnet 260 in a shielded position away from the base 212 of the cylindrical cage 210.

In an alternative embodiment, the steel mass 280 may be rigidly coupled adjacent to the bridge 270, either to the bridge 270 or to the cylindrical cage 210. The steel mass 280 may be coupled to the bridge 270 or cylindrical cage 210 using press-fit assembly, adhesives or similar setting materials, threading, using hardware such as fasteners, or the steel mass 280 may be overmolded within the cylindrical cage 210 during an additive or molding manufacturing processes. In embodiments where the steel mass 280 is coupled adjacent to the bridge 270, the steel mass void 290 instead acts to offset the polymagnet 260 from the base 212 of the cylindrical cage 210 when in the shielded configuration. The steel mass void 290 may be excluded from cylindrical cage 210 entirely when the steel mass 280 is coupled adjacent to the bridge 270. When the steel mass void 290 is excluded, the polymagnet 260 of an embedded magnetic connector 200 may be offset from the interior surface of a side 130-170 by modifications in the socket depth 192.

Figure 10:
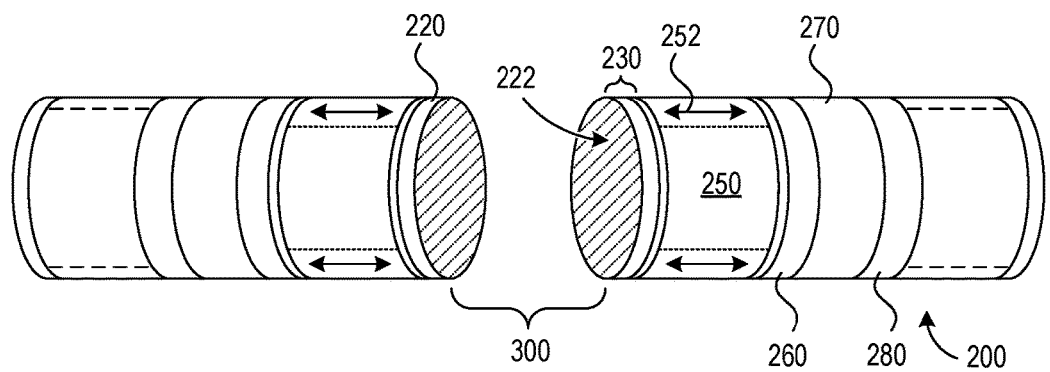
FIG. 10 is an isometric view of two opposing magnetic connectors each in a shielded configuration.

FIG. 10 is an isometric view illustrating one embodiment of two opposing magnetic connectors 200, both in the shielded configuration. The opposing contact surfaces 222 of the magnetic connectors 200 are separated by a gap 300. The polymagnets 260 of each magnetic connector 200 presently exert a shielded holding force against their respective steel masses 280 equal to $F_s$, holding both polymagnets 260 and steel masses 280 against their respective bridge 270 and, when embedded in a modular unit 110, in a recessed location away from the exterior surfaces of the modular unit 110. The optimized magnetic field produced by the polymagnets 260 of each magnetic connector 200 also exerts a holding force against the opposing polymagnet 260, denoted $F_m$. This PTP holding force is related to a shielded polymagnet void gaps 252, the cap thicknesses 230, and the gap 300. More specifically, this holding force is a direct function of the sum of twice the shielded polymagnet void gap 252, twice the cap thickness 230, and the gap 300.

When gap 300 is reduced and the opposing magnetic connector contact surfaces 222 approach one another, $F_m$ increases, aligning the polymagnets 260 and their corresponding magnetic connectors 200. When the gap 300 reaches a certain small distance, $F_m$ will exceed $F_s$ an achieve an activation holding force. At the activation holding force, the holding force polymagnets 260 exert against one another exceeds the shielded holding force the polymagnets 260 exert against their respective steel masses 280. Because the activation holding force exceeds the shielded holding force, the polymagnets 260 move axially within their respective polymagnet voids 250 toward one another and their respective caps 220. If polymagnets 260 do not begin to move axially, a slight perturbance to the magnetic connector 200 will help energize the polymagnets 260 to begin moving away from their locked position. The polymagnets 260 will continue to move toward one another until they contact their respective caps 220 and move to a locked position. In the locked position, the polymagnets 260 will work to eliminate any remaining gap 300 and exert a locked holding force against one another directly related to the thickness 230 of the caps 220. More specifically, the locked holding force is a direct function of the sum of the cap thicknesses 230. This locked holding force represents the greatest force the polymagnets 260 will exert against one another in this illustration. In other embodiments, the cap thickness 230 may be modified to produce stronger or weaker locked holding forces for different magnetic connector 200 or modular unit 110 applications.

Figure 11:
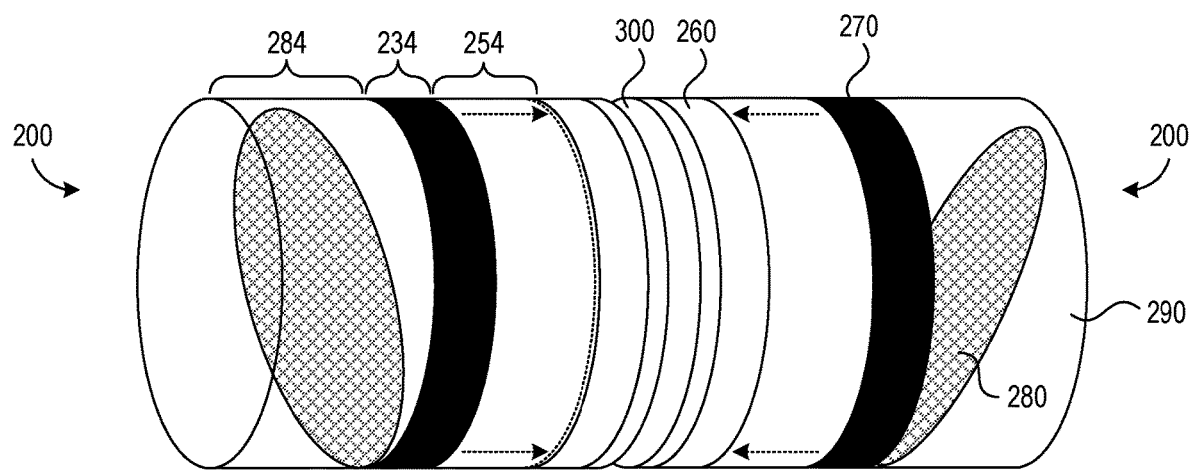
FIG. 11 is an isometric view of two opposing magnetic connectors in a locked configuration.

FIG. 11 is an isometric view illustrating one embodiment of two opposing magnetic connectors 200, each in a locked configuration. In the locked configuration, the polymagnets 260 are aligned, in their respective locked positions, and exerting a locked holding force against one another. In reaching the locked position, the distance between the polymagnets 260 and the steel masses 280 increased, reducing the holding force exerted on the steel masses 280. When this holding force on the steel masses 280 falls below a certain threshold, the steel masses 280 disconnect from their respective bridges 270 and move to a resting position within their respective steel mass voids 290. The steel masses 280 will remain in their resting positions until the magnetic connectors 200 are removed from one another. In the resting position, steel masses 280 are separated from their respective bridges 270 by a steel mass void gap 284. While in the locked position, the polymagnets 260 continue to exert a weak holding force on their respective steel masses 280. This holding force is related to the locked polymagnet void gap 254, the bridge length 234, and the steel mass void gap 284, and the mass of the steel mass 280. More specifically, the holding force exerted is a direct function of the sum of the locked polymagnet void gap 254, the bridge length 234, and the steel mass void gap 284, and the mass of the steel mass 280.

In the locked configuration, the magnetic connectors 200 are aligned along their cylindrical axes and their contact surfaces 222 directly touch and oppose one another. The polymagnets 260, separated only by their caps 220, exert a strong locked holding force against one another. This locked holding force prevents the magnetic connectors 200 from separating without considerable external forces overcoming it. Considerable external forces can be an owner pulling or otherwise intentionally forcing adjacent modular units 110 apart from each other so that their magnetic connectors 200 are separated along their cylindrical axes. Alternatively, considerable external forces can be an owner pivoting an assembled modular unit 110 about its corner placing the cylindrical axes of the adjacent magnetic connectors 200 at a non-parallel angle and misaligning the optimization of the polymagnets 260. As a further alternative, considerable external forces can be an owner sliding or otherwise laterally shifting adjacent modular units 110 and their associated magnetic connectors 200 away from one another while keeping their cylindrical axes and contact surfaces 222 in parallel, respectively. Each of these methods for separating the magnetic connectors 200 acts to increase the gap 300 between the magnetic connector contact surfaces 222, thereby reducing the PTP holding force between the polymagnets 260.

As the magnetic connectors 200 are separated and the gap 300 is increased, the holding force $F_m$ between the polymagnets 260 will decrease. When $F_m$ falls below the activation force Fa, the shielded holding force $F_s$ will exceed $F_m$ and the polymagnets 260 will move within their respective polymagnet void 250 toward their respective steel mass 280. The polymagnets 260 will continue to move toward their respective steel mass 280 until they return to their shielded position against their respective bridge 270, again holding the steel masses 280 against their respective bridges 270 and returning the magnetic connectors 200 to their shielded configuration.

Figure 12:
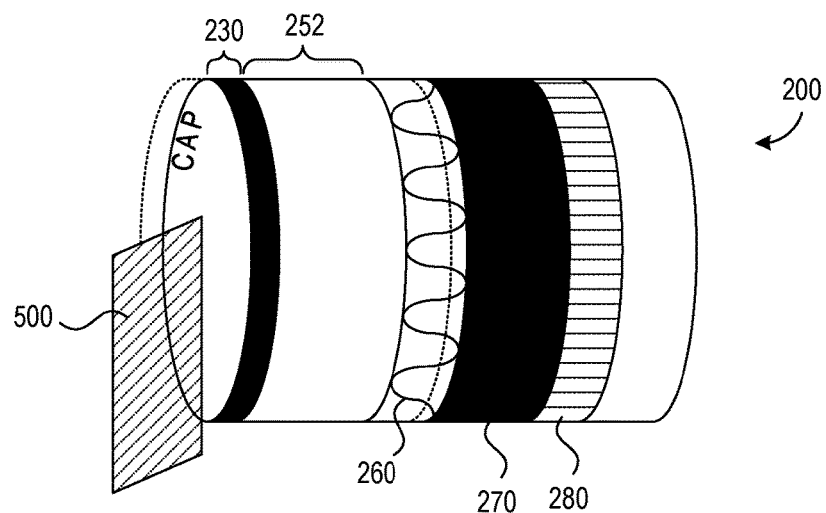
FIG. 12 is an isometric view of a magnetic connector in a shielded configuration with a ferrous material placed on a cap of a magnetic connector.

FIG. 12 is an isometric view illustrating one embodiment of a magnetic connector 200 in the shielded configuration with a ferrous object 500 touching the magnetic connector contact surface 222. Here, from the shielded position, the polymagnet 260 exerts a magnetic holding force against the ferrous object 500 and a shielded holding force against the steel mass 280, as previously discussed. The holding force against the ferrous object 500 is related to the shielded polymagnet void gap 252, the cap thickness 230, and properties of the ferrous object 500. More specifically, the holding force against the ferrous object 500 is a direct function of the sum of the shielded polymagnet void gap 252 and the cap thickness 230, and the ferrous object's 500 mass and shape. The shielded holding force is directly related to the bridge length 234 and the mass of the steel mass 280. These distances (shielded polymagnet void gap 252, cap thickness 230, and bridge length 234) and the mass of the steel mass 280 are configured such that the shielded holding force exceeds the holding force the against ferrous object 500, substantially regardless of the mass or shape of the ferrous object 500. In this configuration, polymagnet 260 remains in the shielded position and away from the cap 220 when the magnetic connector 200 is in the shielded configuration.

Further, given the optimized magnetic field of the polymagnet 260, the holding force against the ferrous object 500 is considerably weak. This force is weak so that the ferrous object 500 cannot activate the polymagnet 260 and force the magnetic connector 200 to be held against the ferrous object 500. Similarly, this force is weak so the ferrous object 500 may not be held against the magnetic connector contact surface 222 by the polymagnet 260 in its shielded position. This configuration reduces the chances for the magnetic connector 200 to inadvertently connect to unintended ferrous objects 500.

Figure 13:
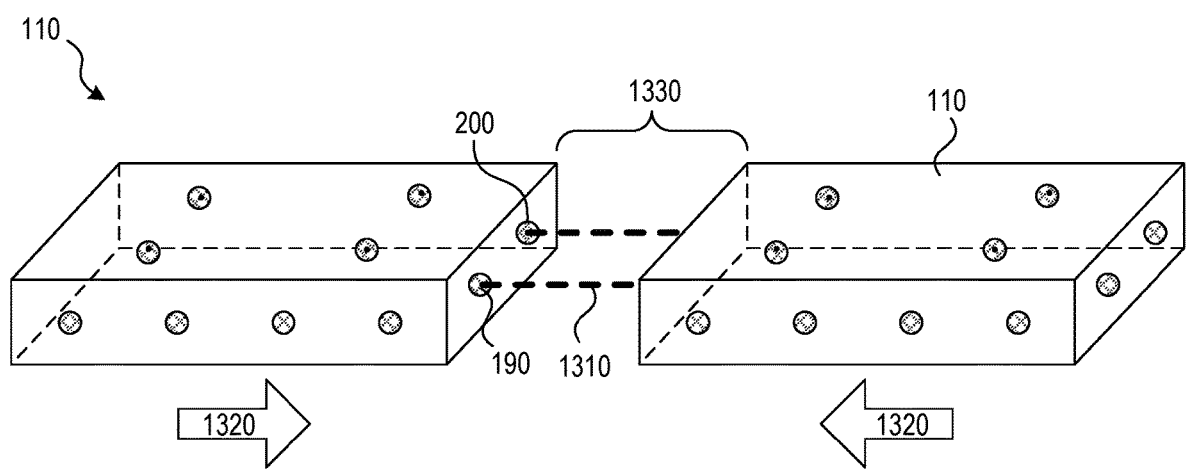
FIG. 13 is a partially exploded isometric view of modular units being aligned and removably connected to each other by the magnetic connectors.

FIG. 13 is an isometric view illustrating one embodiment of magnetic connectors 200 installed within modular units 110 for alignment and securing modular units 110 to construct modular furniture 100. The magnetic connectors 200 embedded within the sockets 190 of the modular units 110 are in the shielded configuration when the modular units 110 rest unassembled. When an owner wants to build modular furniture 100 using the modular units 110, the owner places the modular units 110 near one another with the magnetic connectors 200 roughly aligned along their cylindrical axes 1310. Then, the owner manually pushes the modular unit 110 toward one another 1320, closing a gap 1330. Once the gap 1330 is small, the opposing magnetic connector polymagnets 260 begin to exert PTP holding forces against one another. When the gap 1330 becomes very small, the holding force between the polymagnets 260 within the magnetic connectors 200 embedded in the modular units 110 will reach their activation holding force. Once activated, the polymagnet 260 move to their locked positions and cause the opposing magnetic connectors 200 to move to their locked configuration. In the locked configuration, the magnetic connectors 200 engage and draw the modular units 110 toward one another until their contact surfaces 222 connect. With the polymagnets 260 in their locked position and the magnetic connectors 200 in their locked configurations, the modular units 110 are rigidly assembled to form modular furniture 100.

Rigidly assembled modular furniture 100 is temporarily locked together by the PTP forces between the polymagnets 260 within the magnetic connectors 200. This temporary lock is dictated by the optimized holding force strength of the polymagnets 260 and configured to withstand normal use of the modular furniture, such as opening and closing of drawers, use of the top surface, or placement of a bed on a furniture assembly. When an owner wishes to disassemble the modular furniture 100, he or she must simply apply a great-than-normal-use force on one of the modular units 110 to misalign the magnetic connectors 200. Once misaligned, the magnetic connectors 200 return to their shielded configuration and the modular units 110 can be easily separated. Separated, individual modular units 110 may then easily be transported in a vehicle or by hand to a new location or a new arrangement.

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

As used herein, the word "or" refers to any possible permutation of a set of items. For example, the phrase "A, B, or C" refers to at least one of A, B, and C, or any combination therefore, such as any of A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

I claim:

1. A modular interconnection system for assemblies, comprising:
   a first modular unit having a first surface and a first magnetic connector at the first surface; and
   a second modular unit having a second surface and a second magnetic connector at the second surface, wherein the first surface opposes and is positionable adjacent to the second surface, and wherein the first magnetic connector and the second magnetic connector are aligned and engageable to magnetically hold the first surface and the second surface together;

wherein the first magnetic connector comprises:
 a cage with an end cap at a first end portion;
 a bridge fixedly connected to the cage, and spaced a first distance apart from the end cap to define a magnet void in the cage between the end cap and the bridge;
 a magnet movably positioned within the magnet void in the cage, wherein the magnetic void has a length that is less than a diameter of the magnet; and
 a mass fixedly coupled to a second portion of the cage spaced apart from the first end portion with the bridge being between the mass and the magnet;
 wherein the magnet is movable within the magnet void between a shielded position and a locked position, wherein the magnet in the shielded position is spaced away from the end cap and held against the bridge by a first magnetic attraction between the magnet and the mass, and wherein the magnet in the locked position is spaced apart from the bridge and positioned adjacent to the end cap by a second magnetic attraction with a second magnet of the second magnetic connector that has substantially the same construction as the first magnetic connector, wherein the second magnetic attraction is greater than the first magnetic attraction to cause the magnet to move from the shielded position to the locked position.

2. The modular interconnection system of claim 1 wherein each of the first and second first modular units include a plurality of magnetic connectors with the same configuration as the first magnetic connector, and the first and second modular units have the same configuration and are interchangeable.

3. The modular interconnection system of claim 1 wherein the mass is a steel mass.

4. The modular interconnection system of claim 1 wherein the end cap and the bridge are made of one or more non-magnetic materials.

5. The modular interconnection system of claim 1 wherein the first surface is a first side surface or first bottom surface of the first modular unit, and the second surface of the second modular unit is a second side surface or a second bottom surface of the second modular unit.

6. The modular interconnection system of claim 1, wherein the first modular unit has a third magnetic connector at the first surface and the second modular unit has a fourth magnetic connector at the second surface, and wherein the third magnetic connector and the fourth magnetic connector are aligned and magnetically hold the first surface and the second surfaces together.

7. The modular interconnection system of claim 1 further comprising a third modular unit having a third surface and a third magnetic connector at the third surface, wherein the first modular unit has a fourth magnetic connector at a fourth surface, and wherein the third surface opposes and contacts the fourth surface, and wherein the third magnetic connector and the fourth magnetic connector are aligned and magnetically hold the third surface and the fourth surfaces together.

8. An interconnection module for use with assemblies, comprising:
 a modular unit having a surface; and
 a magnetic connector at the surface, the magnetic connector having:
  a cage with an end cap at a first end portion
  a bridge fixedly connected to the cage and spaced a first distance apart from the end cap to define a magnet void in the cage between the end cap and the bridge;
  a magnet movably positioned within the magnet void in the cage, wherein the magnetic void has a length that is less than a diameter of the magnet; and
  a mass fixedly coupled to a second portion of the cage spaced apart from the first end portion and the bridge is between the mass and the magnet;
  wherein the magnet is movable within the magnet void between a shielded position and a locked position, wherein the magnet in the shielded position is spaced away from the end cap and held against the bridge by a first magnetic attraction between the magnet and the mass, and wherein the magnet in the locked position is spaced apart from the bridge and positioned adjacent to the end cap by a second magnetic attraction from a location adjacent to a side of the end cap opposite the mass, wherein the second magnetic attraction is greater than the first magnetic attraction to cause the magnet to move from the shielded position to the locked position.

9. The interconnection module of claim 8 wherein the magnet is a polymagnet multi-pole encoded magnet.

10. The interconnection module of claim 8 wherein the mass is a steel mass.

11. The interconnection module of claim 8 wherein the catch cage and the bridge are made of one or more non-magnetic materials.

12. The interconnection module of claim 8, wherein the magnetic connector is configured to be in the locked position when aligned and positioned immediately adjacent to a second magnetic connector, and to be in the shielded configuration when out of alignment or immediately adjacent to the second magnetic connector.

13. The interconnection module of claim 8, wherein the magnet has a cylindrical or annular shape.

14. A method for constructing an assembly, comprising:
 providing a first modular unit having a first surface and a first magnetic connector adjacent to the first surface;
 providing a second modular unit having a second surface and a second magnetic connector adjacent to the second surface, wherein the first and the second magnetic connectors each include:
  a cage with an end cap at a first end portion;
  a bridge fixedly connected to the cage, and spaced a first distance apart from the end cap to define a magnet void in the cage between the end cap and the bridge;
  a magnet movably positioned within the magnet void in the cage, wherein the magnetic void has a length that is less than a diameter of the magnet; and
  a mass fixedly coupled to a second portion of the cage spaced apart from the first end portion with the bridge being between the mass and the magnet;
  wherein the magnet is movable within the magnet void between a shielded position and a locked position, wherein the magnet in the shielded position is spaced away from the end cap and held against the bridge by a first magnetic attraction between the magnet and the mass, and wherein the magnet in the locked position is spaced apart from the bridge and positioned adjacent to the end cap by a second magnetic attraction with a second magnet of the second magnetic connector that has substantially the same construction as the first magnetic connector, wherein the second magnetic attraction is greater than the first magnetic attraction to cause the magnet to move from the shielded position to the locked position positioning the first modular unit and the second modular unit with the first surface opposing the second surface, wherein the magnets in each of the first and second magnetic connectors is in the shielded position;

aligning a centerline of the first magnetic connector with a centerline of the second magnetic connector; and moving the first modular unit toward the second modular unit, until each of the first and the second magnetic connectors are adjacent to each other to cause the magnets in the first and second magnetic connectors to move to the locked position.

15. The method of claim 14 wherein at least the first modular unit has an internal storage area, and the method comprises slidably inserting a drawer into the internal storage area.

16. The method of claim 14, further comprising separating the first modular unit from the second modular unit wherein the first and second magnetic connectors are misaligned with each other and causing the magnets in each magnetic connector to move from the locked position to the shielded position.

17. The method of claim 14 further comprising magnetically attaching a third modular unit to the second modular unit, wherein the first, second and third modular units have the same construction and are interchangeable.

* * * * *